United States Patent [19]

Sakano

[11] Patent Number: 4,984,283
[45] Date of Patent: Jan. 8, 1991

[54] TWO DIMENSIONAL HALF-TONE DOT DISCRIMINATION DEVICE

[75] Inventor: Yukio Sakano, Tokyo, Japan

[73] Assignee: Ricoh Company, Ltd., Tokyo, Japan

[21] Appl. No.: 191,139

[22] Filed: May 6, 1988

[30] Foreign Application Priority Data

May 11, 1987 [JP] Japan .................... 62-113793

[51] Int. Cl.$^5$ ........................ G06K 9/00
[52] U.S. Cl. ................... 382/28; 382/63; 358/456; 358/430
[58] Field of Search ............ 382/28, 63, 64; 358/298, 429, 430, 454, 456, 465, 467

[56] References Cited

U.S. PATENT DOCUMENTS

| | | | |
|---|---|---|---|
| 4,144,547 | 3/1979 | Stoffel | 358/430 |
| 4,554,549 | 11/1985 | Ciardiello et al. | 358/456 |
| 4,559,563 | 12/1985 | Joiner, Jr. | 358/430 |
| 4,707,745 | 11/1987 | Sakano | 358/456 |
| 4,717,964 | 1/1988 | Abe et al. | 358/456 |

Primary Examiner—Leo H. Boudreau
Assistant Examiner—Michael R. Cammarata
Attorney, Agent, or Firm—Oblon, Spivak, McClelland, Maier & Neustadt

[57] ABSTRACT

An image area discriminating device for automatically discriminating whether each of the scanned areas of an input image information has been previously subjected to halftone dotting treatment or not. The image area discriminating device may be assembled in a digital copier or like apparatuses. In order to effect better processing of images born on respective areas of the document depending on the characteristics of individual images, the image area discriminating device is used to discriminate precisely and automatically whether the individual images in respective image areas are halftone images or binary-coded images, particularly whether or not the images have been previously subjected to halftone dotting treatment.

8 Claims, 19 Drawing Sheets

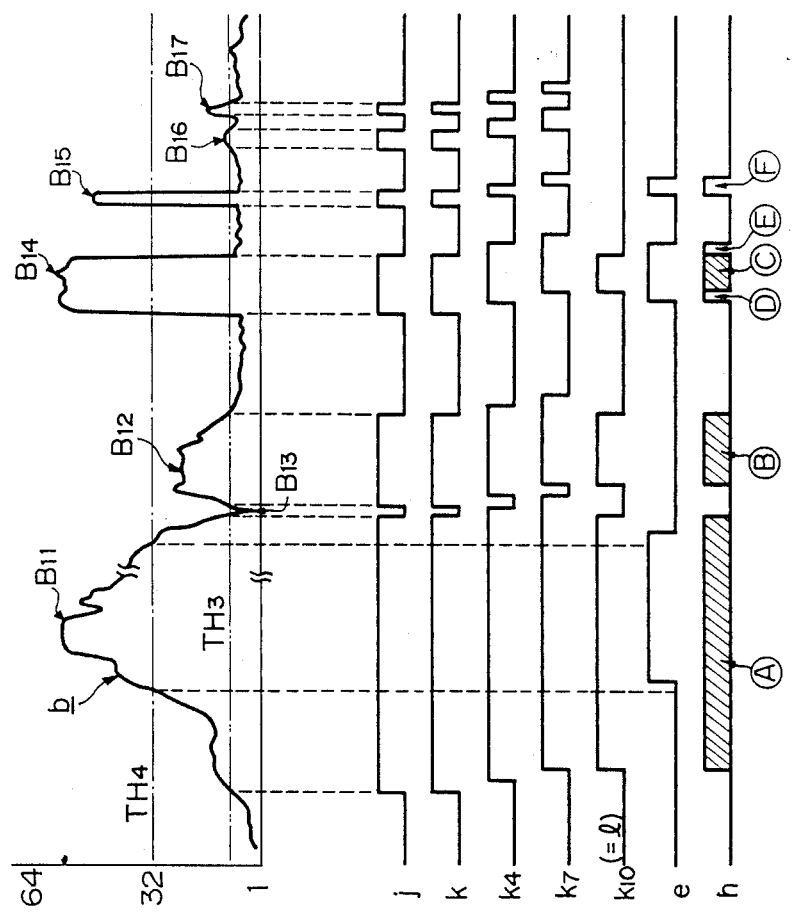

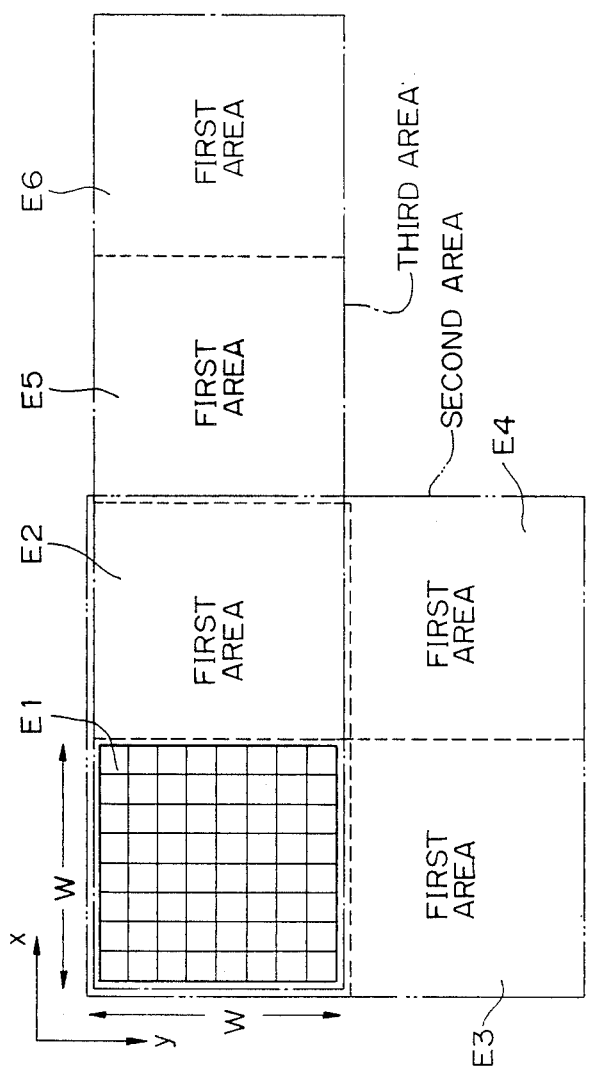

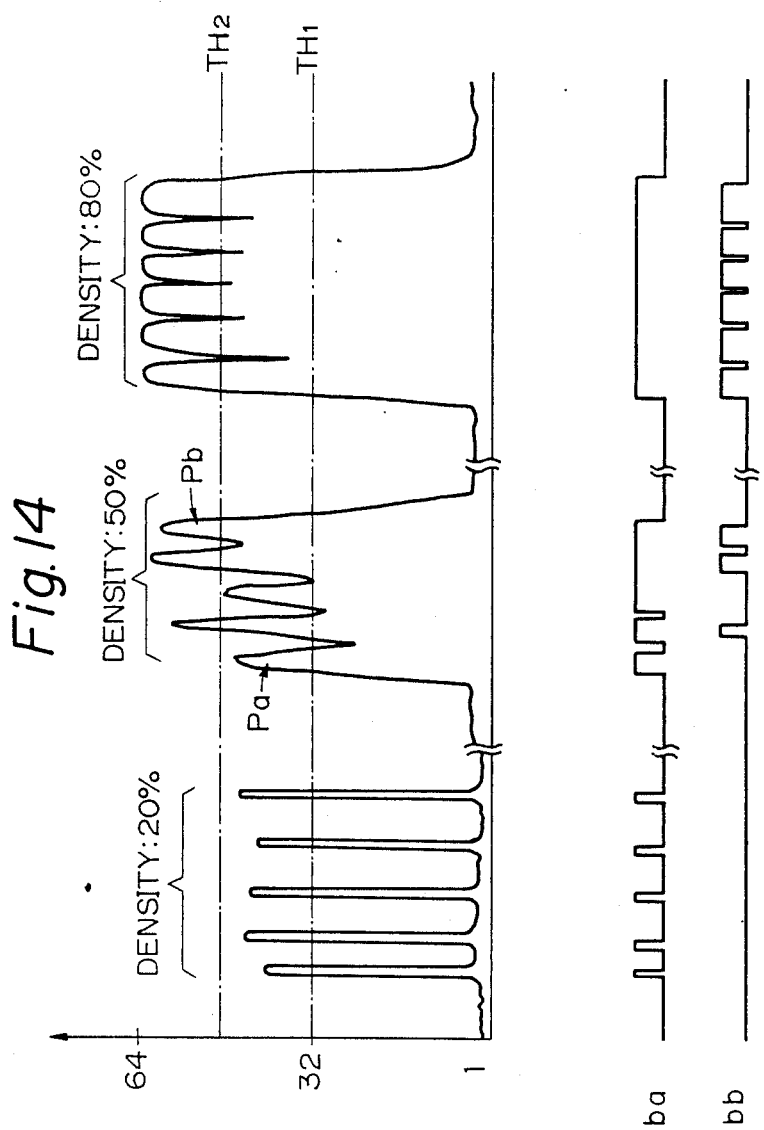

X : BLACK DOT
O : WHITE DOT

X : WHITE DOT
O : BLACK DOT

TWO DIMENSIONAL HALF-TONE DOT DISCRIMINATION DEVICE

BACKGROUND OF THE INVENTION

The present invention relates an image area discriminating device for automatically discriminating whether each of the scanned areas of an input image has been previously subjected to halftone dotting treatment or not. Such an image area discriminating device is assembled in a digital copying apparatus or like equipments.

For example, in a copying apparatus, images on an original document are read by a CCD (charge coupled device) image sensor or like while dividing each image into a plurality of very small areas, i.e. plural picture elements, so that these picture elements are detected by the image sensor to generate analog electric signals which are outputted as the outputs from the image sensor and then processed through an A/D (analog/digital) converter to be converted into digital signals. The digital signals are subjected to various processing sequence and fed to a recording apparatus to form copied images. In a recording apparatus of this type, it is a common practice to effect binary recording for the recording/unrecording, since it is difficult to change the density level for each of the plural picture elements. However, in case where halftone images are contained in the original document, it is necessary to reproduce such halftone images. It has been already proposed to reproduce halftone images in such a binary recording apparatus by means of a dither method, density pattern method or sub-matrix method. Halftone images may be reproduced by using any one of these known methods. On the other hand, when an original document is subjected to halftone dotting treatment, a relatively fair copy can be obtained as far as the densities of the images are varied gently as is the case of copying a photographic image, but the quality of the copy is seriously deteriorated in that the profiles of the copied images become blurred to make it difficult to read the copied letters or the stains on the background of the document sheet are reproduced in the copy if the densities of the images on the document are changed in the binary fashion as is the case of copying letters.

A fair copy of images on a document may be obtained by simple binary processing rather than subjecting them to halftone dotting treatment when the images are letters or like images. A preferable copying mode may be selected by an operator depending on the characteristics of the original document by the provision of a switch for instructing whether the document should be subjected to halftone dotting treatment or not. However, there are many documents which contain halftone images such as photographs and binary images such as letters scattered randomly, as is the case with pamphlets. In such a case, the quality of copied photograph is deteriorated if the binary processing mode is selected, whereas the quality of copied letters is deteriorated if the halftone processing mode is selected.

The digital copying apparatus of this type has another disadvantage. When the image is read by dividing the same into small picture elements which are detected by a line sensor, there is a risk that the problem of a moiré might appear in the recorded image caused by the interference between the pitch of periodic change in density of the image on the document and the pitch of the arranged image detecting sensors (sampling pitch), if the change in density of the image on the document is periodic. For instance, if the document bears a halftone dotted printing image, the change in density of the image is periodic As a result, the moiré problem appears by the interference between the pitch of the periodic density change and the sampling pitch of the detecting sensor. For example, when the rosolving power of the image detecting sensor is 16 picture elements/mm, the moiré problem tends to appear in the detection signals if the density of the halftone dotted printing is in the range of from 133 lines (about 10.5 picture elements/mm) to 200 lines (about 16 picture elements/mm), the range being approximate to the resolving power of the sensor. The Moiré problem might appear when the density of the halftone dots is out of the aforementioned range. The moiré problem appears more frequently if the density of the halftone dots is within a range to cause marked variations in width of the signal.

The halftone dotted printing per se is a kind of pseudo-halftone reproduction, and the density change for each picture element is binary which may be coded as a 1/0 or recording/unrecording. In the halftone dotted printing, the average density of the image is stepwisely changed by changing the pitch of the dots or by changing the dimensions of the dots, wherebY a copy having a general appearance of halftone density is reproduced. Accordingly, setting the problem of moiré aside, halftone dotted images on a halftone dotted printing document can be reproduced as recorded images to obtain a fair copy by processing the signals in the binary processing mode. However, in practical copying of images on a document, the quality of a copy is seriously deteriorated due to the aforementioned moiré problem when the images have preveiously been subjected to halftone dotting treatment and have densities of a particular range.

On the other hand, when the signals obtained by detecting the images are subjected to halftone dotting treatment to convert then into binary signals, the densities of the plural picture elements are averaged or the threshold level is varied in the course of processing, whereby appearance of moiré in the copied image is prevented or the adverse influence caused by the moiré problem is suppressed. Although the densities of the copied images are reproduced in pseudo-halftone, the halftone dots on the copy are not those directly reproduced from the halftone dots on the original document but are formed by the halftone processing particular to the copying apparatus employed. Accordingly, if the images on the original document are those which are formed by halftone dotted printing or by a digital copier, it is recommended to select the copying mode for subjecting the images to halftone processing although the picture elements forming each image are recorded by binary-coding

SUMMARY OF THE INVENTION

It is, therefore, an object of the present invention to provide an image area discriminating device for automatically discriminating whether each of the scanned areas of an original document bears a halftone image or a binary-coded image, particularly whether the image has been previously subjected to halftone dotting treatment or not, prior to subjecting the image information to subsequent processing, so that the thus discriminated image area is processed through more preferable processing sequence depending on the characteristics of the image.

It is another object of the present invention to provide a generally improved image area discriminating device for discriminating whether each of the scanned areas of an input image information has been previously subjected to halftone dotting treatment or not, comprising:

first binary-coding means for binary-coding said input image information into binary data by comparing with a first threshold;

recorded dot detector means for referring said first binary-coded data put out of said first binary-coding means and comparing the two-dimensional matrix pattern of said first binary-coded data with a pre-set recorded dot detection pattern to put out the result of comparison;

second binary-coding means for binary-coding said input image information by comparing with a second threshold which is different from said first threshold;

unrecorded dot detector means for referring the second binary-coded data outputted from said second binary-coding means and comparing the two-dimensional matrix pattern of said second binary-coded data with a pre-set recorded dot detection pattern to output the result of comparison; and halftone dot pattern discriminator means for receiving the output from said recorded dot detector means and the output from said unrecorded dot detector means to discriminate whether the input image information is a halftone dotted pattern or not.

According to the present invention, with the aforementioned objects in view, the two-dimensional matrix pattern of the input image information is compared with a pre-set pattern to detect the recorded dots and unrecorded dots, and the input image information is discriminated by referring to the result of detection whether it is formed of a halftone dotted pattern or not. In case where the image has been previously subjected to halftone dotting treatment, recorded dots (e.g. black picture elements) and unrecorded dots (e.g. white picture elements) are alternately arranged at a certain pitch and at a certain interval. An image is deemed to have been subjected to halftone dotting treatment when a repeated matrix pattern is formed by a recorded dot present at a certain location and unrecorded dots present at the positions that surround the recorded dot, or a repeated matrix pattern is formed by an unrecorded dot present at a certain location and recorded dots present at the positions that surround the unrecorded dot. In other words, a certain input image may be discriminated whether or not it is formed of a halftone dotted pattern by serially scanning target picture elements and by comparing the image information of two-dimensional area composed of respective target picture elements and surrounding picture elements with a pre-set recorded dot detection pattern and unrecorded dot detection pattern one by one.

However, when a halftone dotted image is scanned practically by an image scanner, the detected image pattern is often varied greatly depending on the density of the image to cause erroneous discrimination of halftone dots. In other words, since the density of a certain image is shown by the total area of recorded dots in a certain small area in a halftone dotted printing, the shape and dimensions of dots greatly vary depending on the density of the image. Particularly when the density of a halftone dotted image is approximately 50%, recorded dots (e.g. black picture elements) become contiguous to adjacent unrecorded dots (e.g. white picture elements), or vice-versa, to make it impossible to detect either one of the black dots or white dots. Errors in discrimination a for discriminating the image having a halftone dotting density of about 50% can be decreased by adjusting the threshold level for binary-coding the image information into the recorded picture element level and the unrecorded picture element level. However, by such an adjustment, errors in the discriminations are increased when the image has a halftone dotting density of higher than or lower than 50%.

In view of the foregoing, in accordance with the present invention, at least two thresholds are set and the image information is binary-coded by referring to the two different thresholds in a circuit for detecting recorded dots and also in a circuit for detecting unrecorded dots, and the halftone dotted pattern is discriminated based on the result of both thresholds for detecting the recorded dots and the result for detecting the unrecorded dots. A typical example of a signal obtained by detecting a halftone dotted image by an image scanner is shown in FIG. 14. Referring to FIG. 14, it will be seen that the heights of peaks and depths of troughs of the signal and the duty ratio are varied depending on the densty of the image. Particularly referring to the signal obtained by scanning an image having a density level of 50%, it will be seen that the heights of the peaks and the depths of the troughs of the signal are varied for respective image locations. When the signal from the image having a density of 50% is binary-coded by a threshold $TH_1$, the binary-coded signal for the first portion Pa contains a recorded picture element showing a peak and also contains an unrecorded picture element showing a trough since the peak is higher than $TH_1$ and the trough is lower than $TH_1$; whereas the binary-coded signal for the second portion Pb contains no unrecorded picture element since both of a peak and a trough are higher than $TH_1$. This means that the halftone dots (recorded dots) can be detected from the matrix pattern containing the recorded picture element and the unrecorded picture element for the first portion Pa but the halftone dots cannot be detected for the second portion Pb when the signal is binary-coded only by $TH_1$. On the other hand, when the same signal is binary-coded by a threshold $TH_2$, the binary-coded signal for the first portion Pa contains no recorded picture element since both of the peak and the trough at the portion Pa is lower than $TH_2$; whereas the binary-coded signal for the second portion Pb contains a recorded picture element showing the peak and also contains an unrecorded picture element showing the trough since the peak is higher than $TH_2$ and the trough is lower than $TH_2$. This means that the halftone dots cannot be detected from the matrix pattern for the first portion Pa when the signal is binary-coded by the threshold $TH_2$, but the halftone dots (unrecorded dots) can be detected from the matrix pattern containing the recorded picture element and the unrecorded picture element for the second portion Pb when the signal is binary-coded by the threshold $TH_2$. In summary, by using $TH_1$ as the threshold for coding the halftone dots forming the recorded dots and by using $TH_2$ as the threshold for coding halftone dots forming unrecorded dots, either one of the recorded or unrecorded dots can be detected even if the density of the halftone dotted image is 50%. The recorded dots are detected by referring to the threshold $TH_1$ when the density is as low as 20%, and the unrecorded dots are detected by referring to the threshold $TH_2$ when the density is as high as 80%.

The above and other objects, features and advantages of the present invention will become apparent from the following detailed description taken with the accompnaying drawings.

BRIEF DESCRIPTION OF THE DRAWINGS

FIGS. 5 and 6 are timing charts showing the operations of the circuit of FIG. 4;

FIG. 10b is a plan view showing the binary-coded signal obtained by reading the image shown in FIG. 10a;

FIG. 11 is a plan view showing first, second and third areas which are to be discriminated by the first discriminating section;

FIG. 14 is a timing chart showing tone image signals and binary-coded signals which have been binary-coded by referring to two thresholds.

DESCRIPTION OF THE PREFERRED EMBODIMENTS

Figure 2:
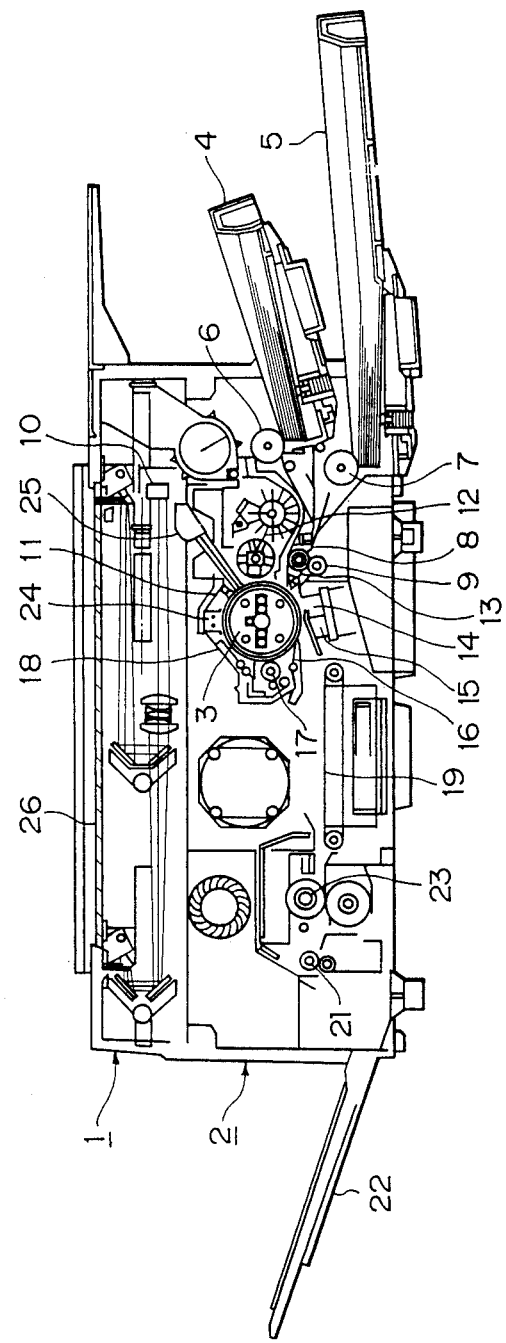
FIG. 2 is a front view showing the construction of a copying apparatus in which the present invention is incorporated.

Initially referring to FIG. 2 showing the mechanical construction of a digital copying apparatus in which an embodiment of this invention is incorporated, the copying apparatus comprises a scanner 1 disposed in the upper portion of a frame, a printer 2 disposed in the lower portion of the frame, and a contact glass plate 26 positioned to cover the top opening of the frame.

The images on an original document placed on the contact glass plate 26 is scanned by the sanner 1 to be read out. The subsidiary scanning is mechanically effected by moving a carriage carrying the scanner 1 in the right and left directions as viewed in FIG. 2 by the actuation of an electric motor MT. The reflected light from the document is passed through mirrors and lenses to be focused on a fixed image sensor 10. The image sensor 10, in the illustrated embodiment, is a CCD line sensor and composed of 5000 read cells arranged to form an array extending perpendicular to the drawing sheet. In this embodiment, the image on the document is divided into 16 picture elements/mm when the copying magnification is 1.0. The main scanning operation is effected electrically by means of a CCD shift register provided in the image sensor 10. The direction of the main scanning is the same as the direction along which the read cells are arranged, namely in the direction perpendicular to the drawing sheet. Signals obtained by sensing the images on the document by the scanner 1 are processed through necesarry steps and then fed to the printer 2. The printer 2 records the images in binary-coded fashion in response to the signals fed thereto.

The printer 2 comprises a laser recording unit 25, a photosensitive drum 3, a static electricity charger 24, a developer 12, a transfer charger 14, a separation charger 15, a fixer 23 and other necessary components. Since the printer 2 is a known laser printer for common use, the detailed construction thereof will not be given but the operation thereof will b briefly decribed in the following paragraph.

The photosensitive drum 3 is rotated in the clockwise direction as viewed in FIG. 2, and has the surface thereof evenly charged by the action of the static electricity charger 24 to have a high electric potential. The thus charged surface is exposed to a laser beam which is modulated in response to the binary-coded signals corresponding to the images to be recorded. The laser beam scans the surface of the photosensitive drum 3 repeatedly along the main scanning direction by mechanical scanning means. Electric potential of the charged surface of the photosensitive drum 3 is changed upon exposure by the laser beam. As a result, in response to the change in incident laser beam, a certain electric potential distribution corresponding to images to be recorded is formed on the surface of the photosensitive drum 3, i.e. latent electrostatic images are formed by such an electric potential distribution. When a portion of the drum formed with such latent electrostatic images is passed through the developer 12, tonor particles adhere the surface of the drum depending on the electric potential at respective portions so that the latent electrostatic images are developed to form visible images. These visible images are transferred, under the action of the transfer charger 14, onto a sheet which is fed from a paper feed cassette 4 or 5 and allowed to contact with the photosensitive drum 3. The paper sheet bearing the transferred images is discharged through the fixer 23 to a paper discharge tray 22.

Figure 3:
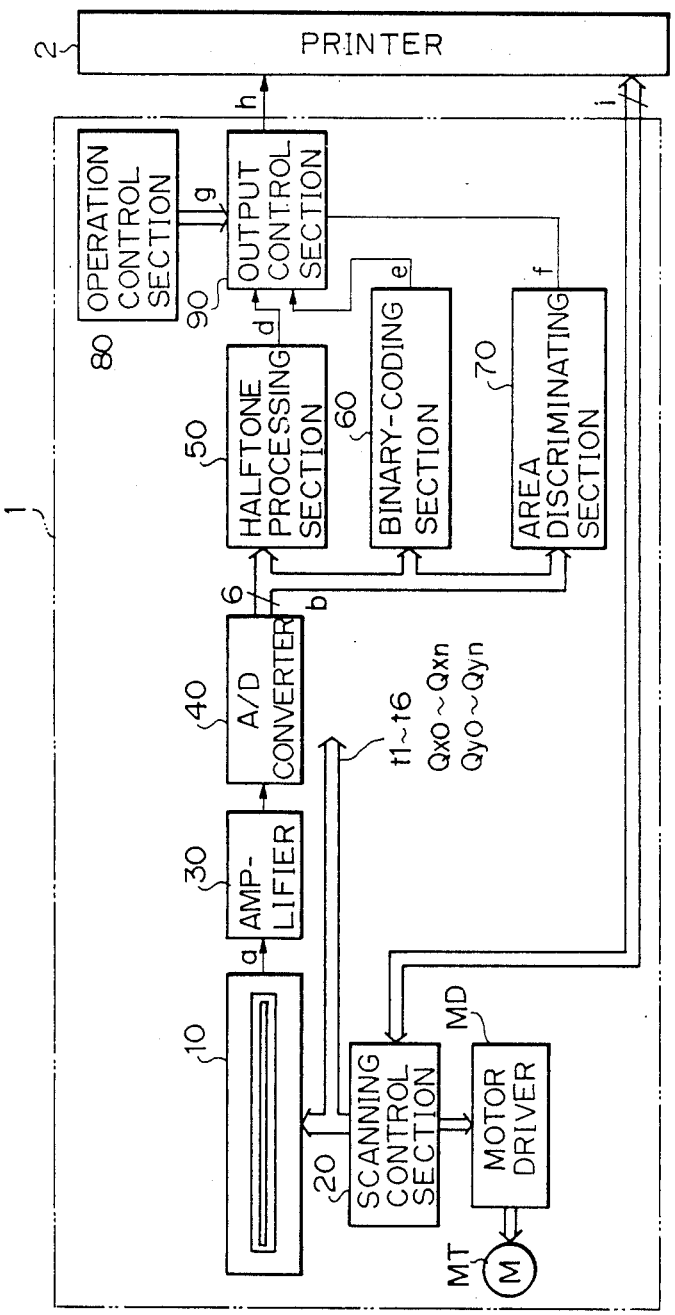
FIG. 3 is a block diagram showing the electric circuit in the copying apparatus of FIG. 2.

FIG. 3 shows the construction of an electric circuit assembled in the digital copying apparatus of FIG. 2. Referring now to FIG. 3, the scanner 1 comprises an image sensor 10, a scanning control section 20, an amplifier 30, an A/D (analog/digital) converter 40, a halftone processing section 50, a binary-coding section 60, an area discriminating section 70, an operation control section 80, an output control section 90 and a motor driver MD. The scanning control section 20 is operated to exchange signals with the printer 2, and to generate various timing signals for controlling main scanning operation, subsidiary scanning operation and other operations. These timing signals are generated in synchronism with the scanning timing. Various condition informing signals, a print starting signal, a copy magnification instructing signal and other necessary signals are fed from the printer 2 to the scanning control section 20. The scanning control section feeds a scanning synchronizing signal, condition informing signals and other necessary signals to the printer 2. By actuating the motor MT, the scanner is moved mechanically to effect subsidiary scanning. The image sensor 10 includes a number of read cells and a CCD shift register, similar to an ordinary CCD line sensor. As the scanning control section 20 generates a signal for synchronizing the subsidiary scanning, the signals accumulated in the multiple read cells of the image sensor 10 are transmitted to respective bits of the CCD shift register concurrently. Then, in synchronism with the main scanning pulse signal, signal shift in the CCD shift register is carried out so that the image signals held in the register are outputted from the output terminal of the register as serial signals, one picture element a time. (As shown by a in FIG. 3; signals generated from the image signal will be denoted by symbols in parentheses in the following description.)

The amplifier 30 amplifies the image signal (a) and removes noises. The A/D concerter 40 converts the analog image signal into for example a 6-bit digital signal. Although not shown in the drawings, the digital signal from the A/D converter 40 is subjected to various processing to effect correction of shading, removal of background, inversion of white to black and other conventional operations, and then in this example fed as a 6-bit signal, i.e. a digital image signal (b) of 64 tones. The digital image signal (b) is applied to a halftone processing section 50, a binary-coding section 60 and an area discriminating section 70. The halftone processing section 50 is a circuit for converting the 6-bit digital image signal (b) into a binary-coded signal (d) containing a halftone information by means of the sub-matrix method. Since the circuit for effecting halftone processing by sub-matrix method has been known in the art and no special modification is added to the circuit used in this embodiment, detailed description of the construction and operation thereof will not be given herein. Other than the sub-matrix method, halftone processing may be effected by means of for example either the dither method or the density pattern method.

In the binary-coding section 60, the input 6-bit digital image signal (b) is subjected to MTF correction, and the corrected signal is compared with a pre-set fixed threshold level $TH_4$ so that a binary image signal (e) is generated depending on the result of comparison. The processing carried out in this section is a simple binary-coding processing, and thus the signal (e) does not contain information relating to the halftone density of the original image. As will be described in detail hereinafter, the area discriminating section 70 is a circuit for discriminating whether or not the original image contains a halftone image information, and feeds a binary output signal (f) to an output control section 90 depending on the result of discrimination. An operation control section 80 is provided to feed a mode signal (g) to the output control section 90 in compliance with the operation of the mode keys on the operation board. The output control section 90 puts out selectively, in response to the mode signal (g) from the operation control section 80 and the binary output signal (f) from the area discriminating section 70, the binary-coded signal (d) from the halftone processing section 50, the binary image signal (e) from the binary-coding section 60 or a signal of predetermined level (white level). The output signal from the output control section 90 is a signal (h) which is fed to the printer 2 as a recording signal. The printer 2 modulates the laser beam in response to this binary signal (h) to effect recording.

Figure 1:
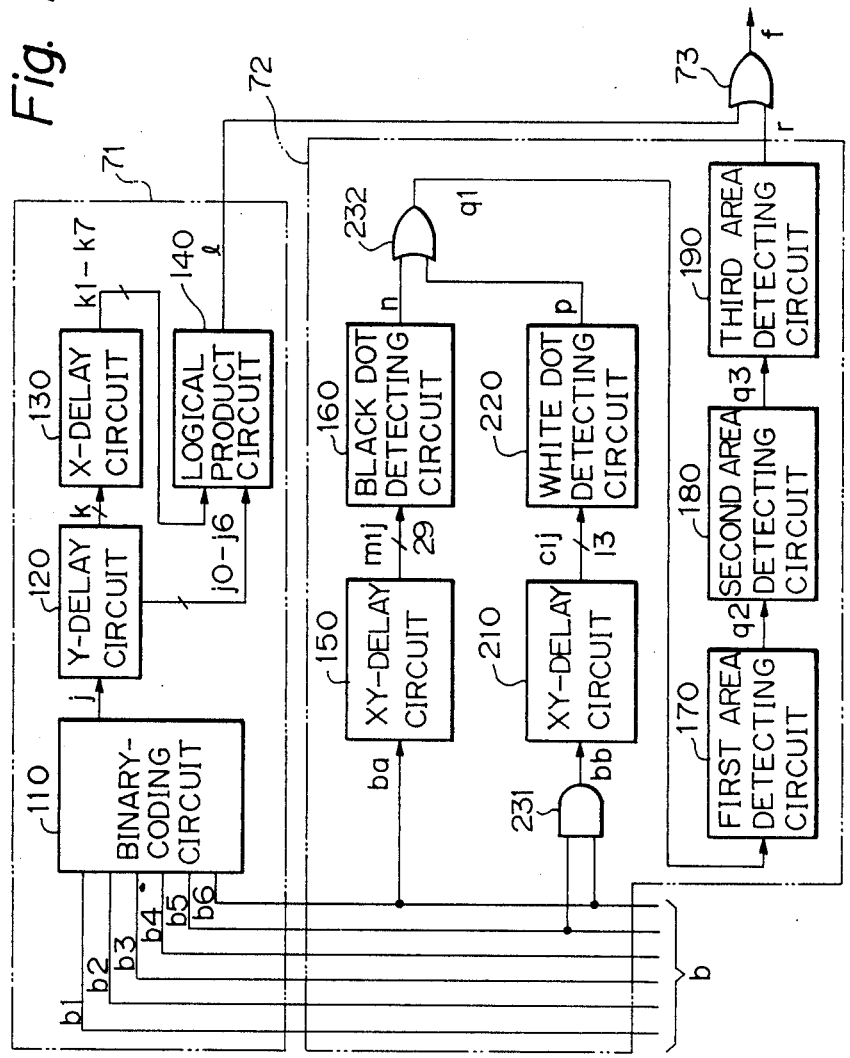
FIG. 1 is a block diagram showing the construction of the area discriminator.

The construction of the area discriminating section 70 of FIG. 3 is illustrated in FIG. 1 as a block diagram.

Referring now to FIG. 1, the area discriminating section 70 comprises a first discriminating section 71, a second discriminating section 72 and an OR gate 73. The first discriminating section 71 is supplied with the 6-bit image signal (b), and the second discriminating section 72 is supplied with the two upper bits (b5, b6) of the image signal (b). The output from the area discriminating section 70 is the logical sum signal (f) which is the sum of the output signal (1) from the first discriminating section 71 and the output signal (r) from the second discriminating section 72. The first discriminating section 71 comprises a binary-coding circuit 110, a Y-delay circuit 120, an X-delay circuit 130 and a logical product circuit 140.

Throughout this specification, the main scanning direction of the scanner is denoted by x or X, and the subsidiary scanning direction of the scanner is denoted by y or Y. The signal "1" of the binary image signal corresponds to the black picture element level, and the signal "0" of the binary image signal corresponds to the white picture element level.

Figure 4:
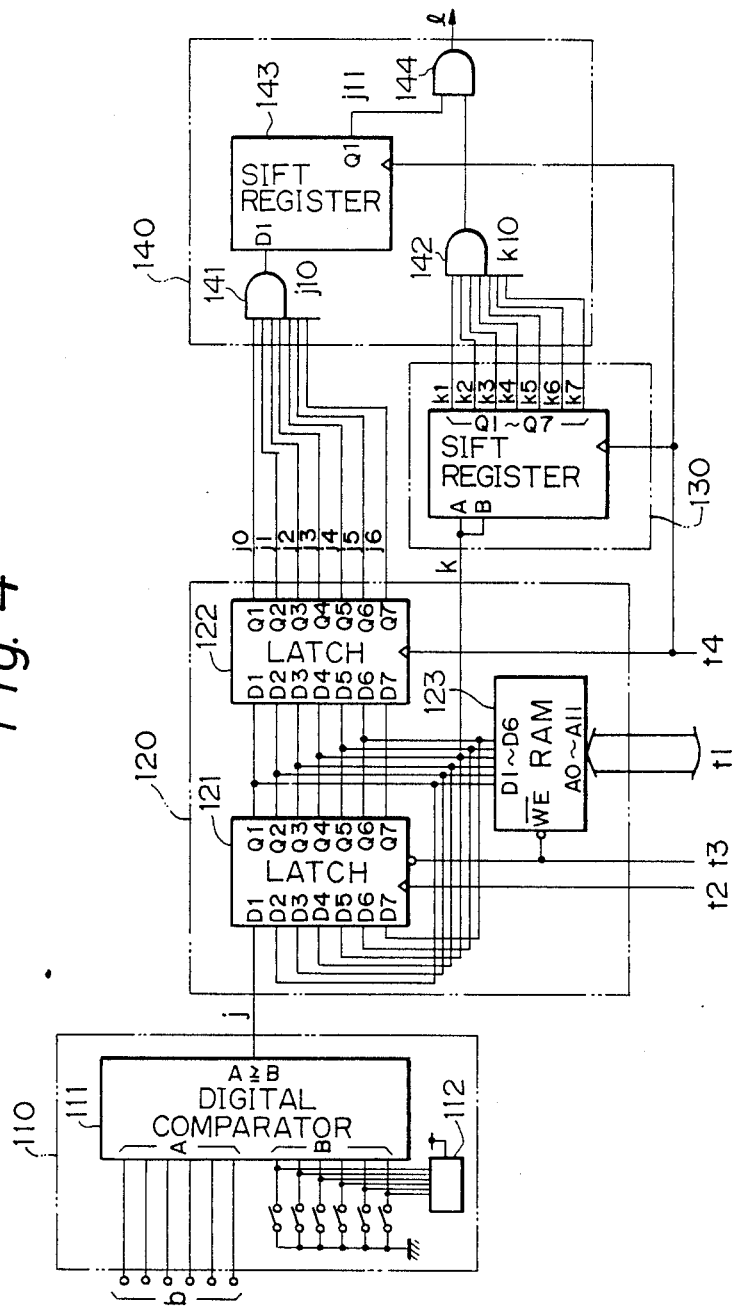
FIG. 4 is an electric circuit diagram in the first discriminating section shown in FIG. 1.
Figure 5:
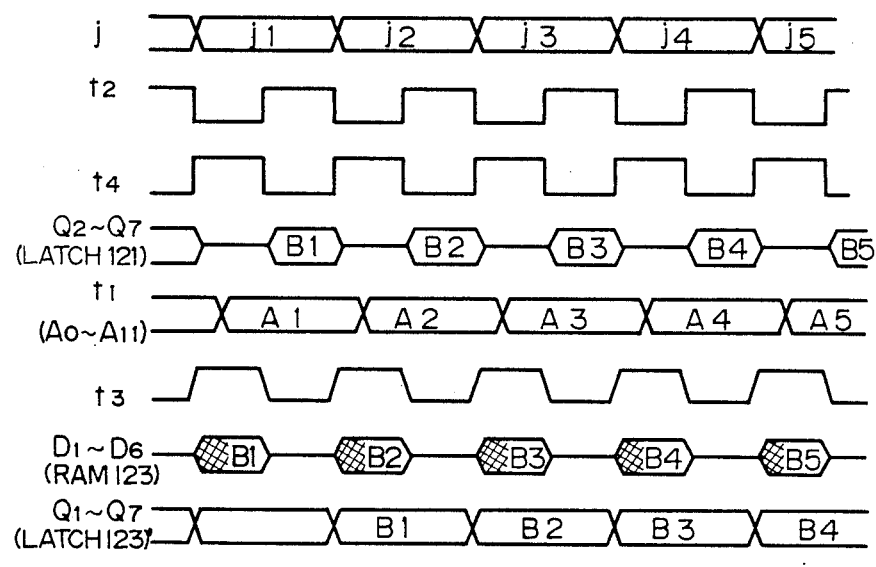

Detailed construction of the first discriminating section 71 is shown in FIG. 4, and exemplified wave forms of the signals from respective circuits and the timing for generating the signals are shown in FIGS. 5 and 6. The first discriminating section will now be described in detail with reference to FIG. 4. The binary-coding circuit 110 includes a digital comparator 111, a pull-up circuit 112 and a switch circuit 113. The digital comparator 111 compares the value of the digital image signal (b) applied to the 6-bit input terminals A thereof with the value of the digital reference signal applied to the other 6-bit input terminals B to put out the result of comparison. In detail, if $A \geq B$, the signal (j) takes the value "1" (corresponding to the high level H); and if not, the signal (j) takes the value "0" (corresponding to the low level L). The switches in the switch circuit 113 are set so that the value at the input terminal B of the comparator 111 takes a predetermined threshold $TH_3$. This threshold $TH_3$ may be variable, and is normally set to a value corresponding to a relatively low density level as shown in FIG. 6. In this embodiment, the threshold $TH_4$ used in the binary-coding section 60 is set to take the center level (32) of the density tone.

Thus, in the illustrated binary-coding circuit 110, a picture element having a density considerably lower than the density level of the standard black picture element is discriminated as though it is beyond the black level.

The Y-delay circuit 120 is a circuit for processing the output signal (j) from the binary-coding circuit 110 to delay the timing of the signal in the y direction, i.e. in the subsidiary scanning direction, by a time corresponding to a predetermined number of picture elements. Seven signals $j_n$ and k are generated from the Y-delay circuit. In FIG. 4, the signal $j_n$ indicates a signal which is obtained by delaying the signal j in the y direction by a time corresponding to n picture elements The signal k is delayed by the same timing as that of the signal j3. By delaying the signal in the y direction by a magnification of the picture element, plural image signals adjacent with each other in the y direction may be outputted as parallel signals. In other words, this circuit may be deemed as a serial/parallel converting circuit.

FIG. 5 shows the operation timing of the Y-delay circuit 120. The operation of the Y-delay circuit 120 will now be decribed with reference to FIG. 5 in combination with FIG. 6. The input signal (j) is latched by the latch 121 in response to the clock pulses $t_2$ put out at the timings corresponding to every picture elements along the x direction. That is, the signal (j) applied to the input terminal D1 of the latch 121 is transmitted to the output terminal Q1 and kept in this condition. Upon receipt of the clock pulse $t_3$, the states of the output terminals Q1 to Q6 of the latch 121 are stored at the timings of every picture elements along the x direction in respective bits of the RAM (random access memory) 123. The memory address for storing is instructed by the address signal $t_1$. The content of the address signal $t_1$ is updated for every picture element along the x direction so that the same content (value) is set for all picture elements located at the same position along the x direction. Thus, the signal $t_1$ corresponds to the position of the picture element along the x scanning direction. Since the number of picture elements along the x direction is 5096 in this embodiment, the signal $t_1$ is a parallel signal of 12 bits.

The memory in the RAM 123 is read out for every picture elements along the x scanning direction upon receipt of the clock pulse $t_3$. The read-out data are the data which have previously been stored for those positions along the x direction. Referring now to the connections between the data lines D1 to D6 of the RAM 123 and the latch 121, the bits 1, 2, 3, 4, 5 and 6 of the data lines of the RAM 123 are connected, respectively, to the input bits 2, 3, 4, 5, 6 and 7 of the latch 121 in a manner so that a certain bit of the data lines of the RM 123 is shifted to be connected to the input bit of the next number of the latch 121. A signal (j) fed at a certain timing is latched at bit 1 of the latch 121, and then stored in bit 1 of the RAM 123 before the datum of the next picture element is set to the latch 121. The signal is then read out at a timing delayed by a time corresponding to one picture element from bit 1 of the RAM 123, and the thus read-out signal is applied to bit 2 of the input terminal D2 of the latch 121. The latter-mentioned signal is latched at bit 2 of the latch 121 at a timing when a next picture element signal of the same position along the x direction and delayed by a time corresponding to one picture element along the y direction is latched at bit 1 of the latch 121.

The aforementioned operation is repeated so that the signals are sequentially transmitted to bits 3, 4, 5, 6 and 7 of the latch 121 for every time when the timing goes forward along the y direction one picture element a time. Eventually, when the first signal is latched at bit 7 of the latch 121, bits 6, 5, 4, 3, 2 and 1 of the latch 121 latch the signals which are delayed respectively by the timings corresponding to one, two, three, four, five and six picture elements. In this manner, the output terminals Q1 to Q7 of the latch 121 hold seven picture element signals of the same timing and of the same position along the x direction, the seven picture element signals being adjacent one after another along the y direction. The latch 122 controls the timing of the signals to a circuit which is connected to the output terminal of the Y-delay circuit 120 Accordingly, the signals j0 to j6 are substantially same to the output signals fed from the latch 121.

Meanwhile, it should be noted here that the signals denoted by j1, j2, -- ---, B1, B2, B3, ----- and A1, A2, A3, ----- in FIG. 6 are signals changed for every picture elements along the x direction, and are thus different from the output signals from the latch 122.

The output signal k from the Y-delay circuit 120 is apllied to an X-delay circuit 130. The X-delay circuit 130 is comprised of one shift register, as shown in FIG. 4. The signal (k) is applied to the serial data input terminals of the shift register. Signals (k1, k2, k3, k4, k5, k6 and k7) are outputted from the parallel data output terminals Q1 to Q7 of the shift register. This shift register 130 shifts the data by one bit per one clock pulse $t_4$ which is put out for every time when the scanned position along the x direction is changed by one picture element. For example, one signal k applied to the shift register at a certain time is transmitted to bit 1 of the output terminal (k1) at the next picture element timing (along the x direction), and then sequentially transmitted to the bits 2, 3, 4, 5, 6 and 7 as the picture element timing is changed. For example, supposing now that the signal (k7) indicates the picture element positioned at the Nth position along the x axis of the coordinates for indicating the position of picture elements, the positions along the x axis or x direction of the picture elements indicated by the signals (k6, k5, k4, k3, k2 and k1) are respectively $N+1$, $N+2$, $N+3$, $N+4$, $N+5$ and $N+6$, the positions of these picture elements along the y axis or y direction being aligned with that of the picture element indicated by the signal (k7). In other words, the signals (k1 to k7) are the signals indicating seven picture elements adjacent one after another in the x direction, and these signals are obtained at the same time. Accordingly the X-delay circuit 130 may be deemed as a serial/parallel converter circuit for serial picture element signals.

The output signals (j0 to j6 and k1 to k7) from the Y-delay circuit 120 are applied to a logical product circuit 140. An AND gate 141 generates and outputs a "1" when all of the signals (j0 to j6) take the value "1", and generates an output "0" when at least one of the signals (j0 to j6) takes the value "0". Namely, the output signal (j10) from the AND gate 141 takes "1" when all of the seven picture elements aligned along the x direction and adjacent one after another along the y direction are in the black level (above the threshold $TH_3$). This signal (j10) is delayed by a time corresponding to predetermined number of picture elements (i picture elements) along the x direction by means of a shift register 143, and then applied to an AND gate 144 as a signal (j11). The AND gate 142 generates an output "1" when all of the signals (k1 to k7) take the value "1", and generates an output "0" when at least one of the signals (k1 to k7) takes the value "0". Namely, the output signal (k10) from the AND gate 142 takes "1" when all of the seven picture elements aligned along the y direction and adjacent one after another along the x direction are in the black level (above the threshold $TH_3$). The output signal (1) from an AND gate 144 is a logical product of the signal (j11) and the signal (k10).

As will be apparent from the foregoing description, the first discriminating section 71 discriminates that a halftone information is present (1 takes the value "1") for a certain target picture element, when all of the seven picture elements forming a line along the x direction with the target picture element positioned at the center and all of the seven picture elements forming a line along the y direction with the target picture element positioned at the center are in the black level (above the threshold $TH_3$). The shift register 143 is provided to shift the signal (j11) relative to the signal (j10) along the x direction so that the timing of the seven picture elements along the x direction are adjusted to agree with the timings of the seven picture elements along the y direction. In this example, the signals (j0 to j6) are aligned with the signal (k) in the x axis or direction, and hence the signal (j10) is shifted by i picture elements (by four picture elements in the illustrated example) along the x axis so as to have the seven signals (j11) forming a line along the y direction and aligned, in the x direction, with the signal (k4) which is the center signal of the seven signals forming a line along the x direction. In general, each small pattern may be deemed to occupy a substantially circular area, and thus it is recommended to pick up the target picture element as though the target picture element is located at the center point of a group of picture elements forming a pattern of a "+" shape.

Referring now to FIG. 6 showing only the signals along the x direction for easy understanding, the description relating to the operation will be continued. Since the digital signal (b) is a 6-bit signal it contains a density or tone information of 64 steps. In the illustrated example, the signal (b) includes signals (B11, B12) indicating halftone images, such as photograph or like, a signal (B13) indicating the background (white) image, a signal (B14) indicating a letter written by a relatively thick line (e.g. a picture element of binary density), a signal (B15) indicating a letter written by a relatively thin line, and signals (B16, B17) indicating stains on the document sheet. Since the signals are binary-coded by the binary-coding circuit 110 whose threshold level is $TH_3$ corresponding to a low density level, all signals of the image signal (j) are coded as indicating black picture elements as far as some images are present at the scanned locations notwithstanding that the densities of the images are very low. On the contrary, the output signals (e) from the binary-coding section 60 whose threshold is at an intermediate level 32 contains signals indicating white picture elements for halftone images of low density and signals indicating black picture elements for halftone images of high density.

Since the signal (k10) takes the value "1" only when successive seven picture elements along the x direction are coded as black image signals, in other words, only when the pattern has an area larger than predetermined dimensions, the signal (k10) takes the value "1" for each of the image signal portions (B11, B12 and B14) but takes the value "0" for each of the image signal portions (B13, B15, B16 and B17). As the signals are generally selected as halftone signals (d) and binary-coded signals (e) by referring to the signal (k10), the portions A, B and C of the signal (h) in FIG. 6 indicate halftone signals (d) and the portions C, D and E of the signal (h) indicate binary-coded signals (e). Although the portions C, D and E cover the same letter portion, the signal portions D and E indicating the marginal portions of the letter are binary-coded since each of the signal portions D and E contains only 6 picture elements (along the x direction) which are less than 7 picture elements for discriminating the same as a halftone image information. Both of the portions (B16 and B17) of the image signal (b) are binary-coded while referring to the threshold level $TH_4$, and thus these image signal portions indicating stains on the document sheet are not contained in the output signal for reproducing a copied image.

Figure 8:
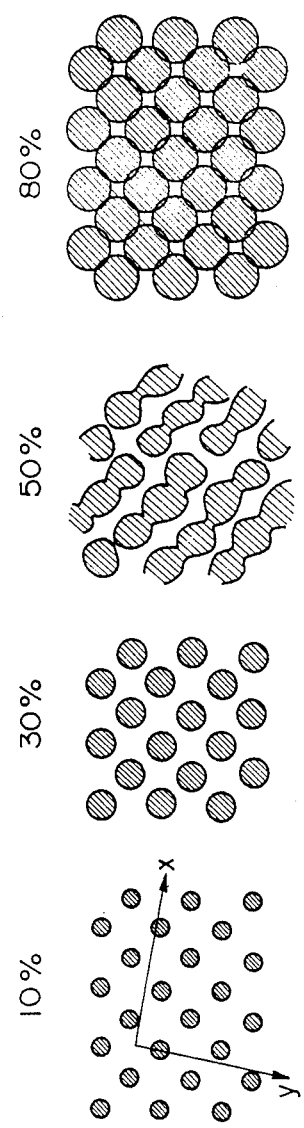
FIG. 8 is a plan view showing, in enlarged scale, four halftone dotted printing images having different densities.

Referring now to FIG. 1, the second discriminating section 72 will be described in detail. In brief, the second discriminating section 72 is a circuit for discriminating the presence or absence of a halftone dotted pattern. The second discriminating section comprises a circuit for detecting black dots of the halftone dotted pattern, a circuit for detecting white dots of the halftone dotted pattern, a circuit for discriminating the presence or absence of halftone dots in a first area, a circuit for discriminating the presence or absence of halftone dots in a second area, and a circuit for discriminating the presence or absence of halftone dots in a third area. A black dot detecting circuit 160 detects black dots in the halftone dotted pattern. Meanwhile, examples of the black dots include the halftone dots of 10% and 30% shown by hatched dots in FIG. 8, these dots being recorded dots (generally black dots) arranged regularly to form a certain matrix. The black dot detecting circuit processes the output signals (mij) indicating 29 picture elements and fed from an XY-delay circuit 150 to discriminate the presence or absence of black dots. The XY-delay circuit 150 is a circuit to delay the input signals both in the x and y directions to feed plural image signals contained in a certain two-dimensional area at the same time. Only the most significant bit (MSB) of the input image signal (b) is applied to the circuit 150. The signals processed by the XY-delay circuit 150 are, thus, binary signals which take the value "1" when the tone of the image signal (b) is not less than 32 and take the value "0" when the tone of the image signal (b) is less than 32. The black dot detecting circuit detects black dots by referring to binary-coded signals which are obtained by binary-coding respective image signals (b) by the threshold 32 ($TH_1$). The white dot detecting circuit 220 detects white dots of the halftone dotted pattern. Meanwhile, examples of the white dots include unrecorded dots (generally white dots) indicating voids or gaps between the recorded dots which are shown by hatched dots and arranged regularly to form a certain matrix as shown by the halftone dotted pattern of 80% in FIG. 8. The white dot detecting circuit processes output signals (cij) indicating 13 picture elements and fed from the XY-delay circuit 210 to discriminate the presence or absence of white dots.

The XY-delay circuit 210 is a circuit to delay the input signals both in the x and y directions to feed plural image signals contained in a certain two-dimensional area at the same time. A logical product of two bits (b5 and b6) which are the most and the next significant bits of the input image signals (b) is applied to the circuit 210. The signals processed by the XY-delay circuit 21 are binary signals which take the value "1" when the tone of the image signal (b) is not less than 48 and take the value "0" when the tone of the image signal (b) is less than 48. The white dot detecting circuit detects white dots by referring to binary-coded signals obtained by binary-coding the image signal (b) by the threshold 48 ($TH_2$). In response to the presence/absence of black dots, the signal (n) is set to 1/0; and in response to the presence/absence of white dots, the signal (p) is set to 1/0. The logical sum of the signal (n) and the signal (p) is the signal (q1) which is applied to a first area detecting circuit 170. The first area detecting circuit 170 processes the signal (q1) to generate a signal (q2) which is processed by a second area detecting circuit 180. The second area detecting circuit 180 generates a signal (q3) which is processed by a third area detecting circuit 190. The third area detecting circuit 190 generates an output signal (r). The logical sum of the signal (r) and the signal (1) is the signal (f) which is outputted from the area discriminating section 70.

Figure 7A:
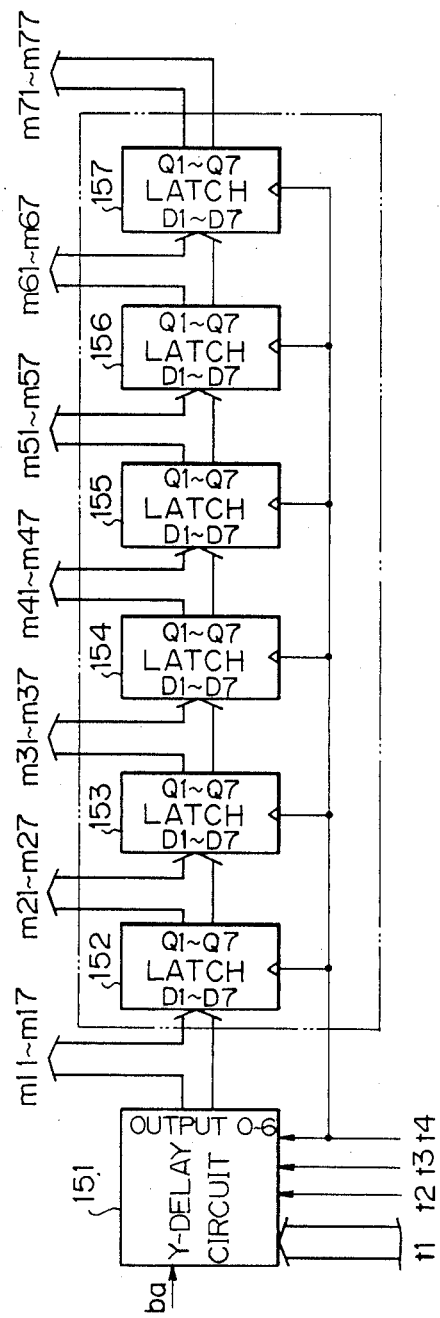
FIGS. 7a, 7b, 7c, 7d and 7e show electric circuits in the second discriminating section shown in FIG. 1.

FIG. 7a shows the construction of the XY-delay circuit 150. Referring to FIG. 7a, the circuit 150 comprises a Y-delay circuit 151 and an X-delay circuit The construction of the Y-delay circuit 151 is similar to that of the Y-delay circuit 120 shown in FIG. 4, except that only seven output terminals of the latch (which is similar to the latch 122) are used since the signal corresponding to the aforementioned signal (k) is not necessary. The signals (m11 to m17) outputted from the Y-delay circuit 151 indicates seven picture elements aligned along the x direction and disposed adjacent one after another along the y direction. The X-delay circuit has six 7-bit latches 152, 153, 154, 155, 156 and 157. The latch 152 latches the output signals (m11 to m17) from the Y-delay circuit, and the latches 153, 154, 155, 156 and 157 latch, respectively, the output signals (m21 to m27), (m31 to m37), (m41 to m47), (m51 to m57) and (m61 to m67) fed from the latches 152, 153, 154, 155 and 156 in synchronism with the clock pulse $t_4$. Accordingly, each of the signals (m21, m31, m41, m51, m61 and m71) is a signal which is obtained by delaying the signal (m11) by a time corresponding to 1, 2, 3, 4, 5 and 6 picture elements along the x direction. Consequently the XY-delay circuit 150 generates the signals mij indicating picture elements contained in a 7 × 7 matrix (i.e. seven picture elements along the x direction and seven picture elements along the y direction) concurrently.

Figure 7B:
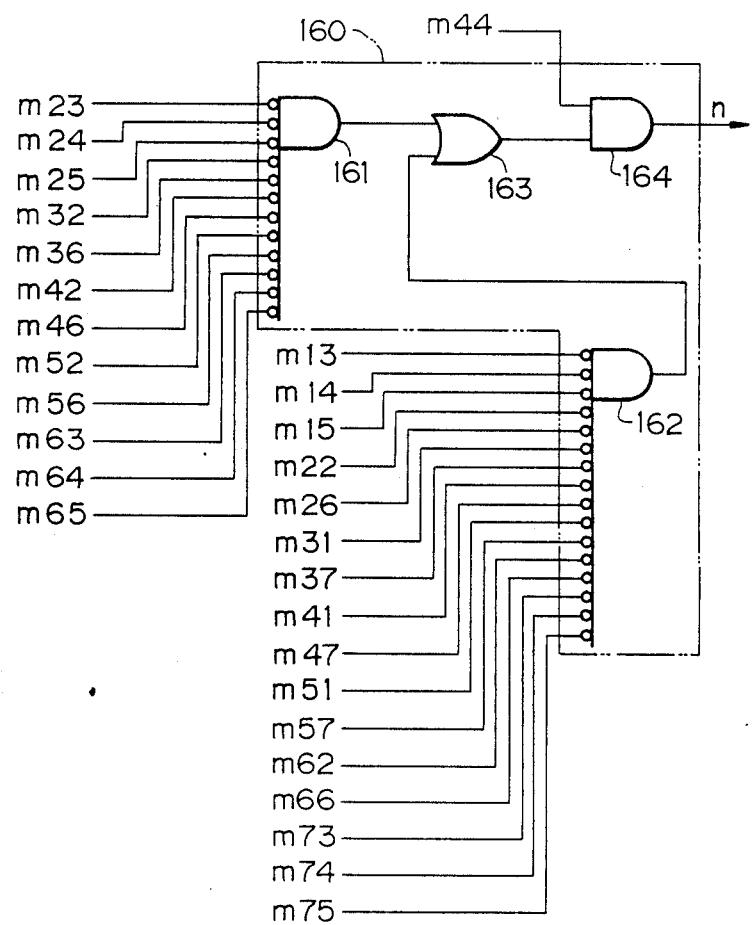
Figure 9A:
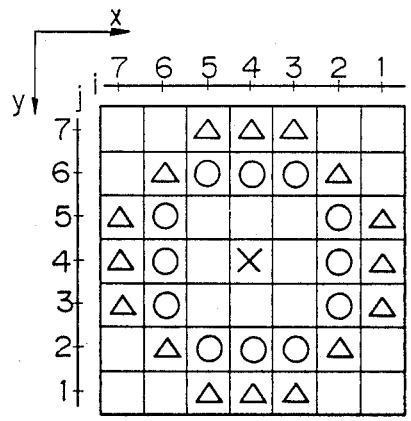
FIGS. 9a and 9b are plan views showing the matrix patterns of picture elements for detecting, respectively, black dots and white dots.

FIG. 7b shows an embodiment of the black dot detecting circuit 160. Referring to FIG. 7b, the black dot detecting circuit 160 comprises four gate circuits 161, 162, 163 and 164. The output signals mij from the XY-delay circuit 150 are applied to the gate circuits 161, 162 and 164. In the illustrated embodiment, a detection pattern shown in FIG. 9a is used for detecting a black dot. FIG. 9a shows a two-dimensional matrix area composed of 7×7 picture elements. It is conditioned to discriminate that a black dot is present (the output signal takes the value "1") if the picture element (m44) denoted by the mark X has the black picture element level and all of the twelve picture elements denoted by the mark O have the white picture element level or the picture element (m44) denoted by the mark X has the black picture element level and all of the sixteen picture elements denoted by the mark Δ have the white picture element level, and to discriminate that a black dot is not present (the output signal takes the value "0") in other cases.

In order to detect the picture elements denoted by the mark O in FIG. 9a, the input terminals of the gate circuit 161 shown in FIG. 7b are fed with signals indicating twelve picture elements m23, m24, m25, m32, m36, m42, m46, m52, m56, m63, m64 and m65. On the other hand, in order to detect the picture elements denoted by the mark Δ in FIG. 9a, the input terminals of the gate circuit 162 are fed with signals indicating twelve picture elements m13, m14, m15, m22, m26, m31, m37, m41, m47, m51, m57, m62, m66, m73, m74 and m75. In case where at least one of the results of discrimination by the gate circuits 161 and 162 takes the value "1" and the signal indicating the center picture element m44 takes the value "1", the condition for discriminating that the pattern of FIG. 9a has a black dot is satisfied, and thus the output (n) from the black dot detecting circuit 160 takes the value "1" to indicate that a black dot is detected.

Figure 7C:
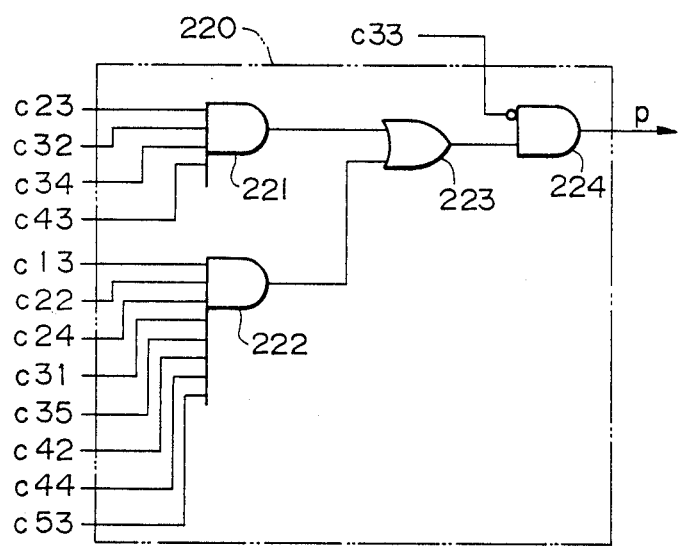
Figure 9B:
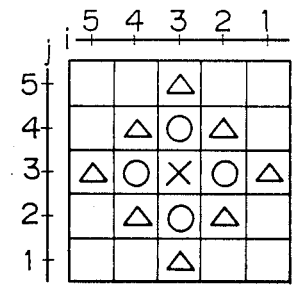

In the illustrated embodiment, a detection pattern shown in FIG. 9b is used for detecting a white dot. FIG. 9b shows a two-dimensional matrix area composed of 5×5 picture elements. It is conditioned to discriminate that a white dot is present (the output signal takes the value "1") if the picture element (c33) denoted by the mark X has the white picture element level and all of the four picture elements denoted by the mark O have the black picture element level or the picture element (c33) denoted by the mark X has the white picture element level and all of the eight picture elements denoted by the mark Δ have the black picture element level, and to discriminate that a white dot is not present (the output signal takes the value "0") in other cases. Such a detection is effected by an XY-delay circuit 210 and a white dot dettecting circuit 220. The function of the XY-delay circuit 210 is similar to that of the circuit 150 described above, and the circuit construction of the XY-delay circuit 210 is simplified as the size or dimensions of the two-dimensional area is decreased as of 5×5 picture elements. An embodiment of the white dot detecting circuit 220 is shown in FIG. 7c. Referring to FIG. 7c, the circuit 220 comprises four gate circuits 221, 222, 223 and 224. Signals indicating the picture elements c23, c32, c34 and c43 denoted by the mark O in FIG. 9b are applied to the input terminals of the gate circuit 221. Signals indicating the the picture elements c13, c22, c24, c31, c35, c42, c44 and c53 denoted by the mark Δ in FIG. 9b are applied to the input terminals of the gate circuit 222. In case where at least one of the results of discrimination by the gate circuits 221 and 222 takes the value "1" and the signal indicating the center picture element c33 takes the value "0", the condition for discriminating that the pattern of FIG. 9b has a white dot is satisfied, and thus the output (p) from the white dot detecting circuit 220 takes the value "1" to indicate that a white dot is detected.

Figure 10A:
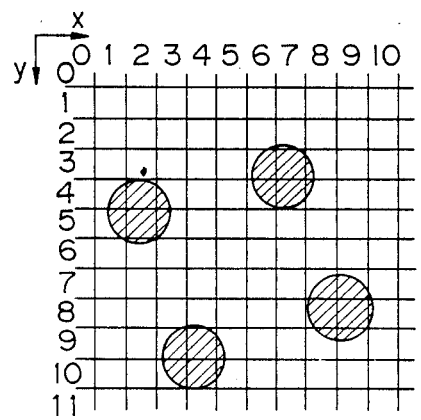
FIG. 10a is a plan view showing a portion of an image formed by halftone dotted printing.
Figure 10B:
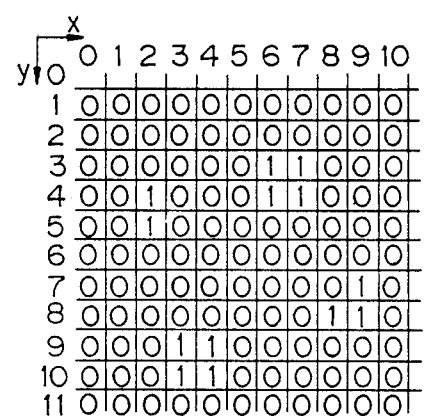

FIG. 10a shows an exemplary halftone dotted pattern showing the positional interrelation between the dots and the picture elements, and FIG. 10b shows the matrix or signals which is obtained by binary-coding signals indicating respective picture elements in FIG. 10a by a certain threshold. The presence or absence of halftone dots will now be discriminated by the signal matrix shown in FIG. 10b. For instance, supposing now that the target picture element m44 is located at the position (6,4) of the ordinates shown in FIG. 10b, as the picture element denoted by the mark X in FIG. 9a has the black picture element level and all of the picture elements denoted by the marks O and Δ have the white picture element level, the output (n) from the black dot detecting circuit 160 takes the value "1" to indicate that a black dot is present. As has been described hereinbefore, in this embodiment, the threshold level $TH_1$ for binary-coding the image signals in the black dot detecting system is different from the threshold level $TH_2$ for binary-coding the image signals in the white dot detecting system. By differentiating the threshold $TH_1$ from the threshold $TH_2$, error in detection of halftone dotted printing is effectively avoided when the density of the halftone dotted printing is approximately to 50%. FIG. 14 shows three signal wave forms showing the image tones and the corresponding binary-coded signals, the three signal wave forms being obtained by reading images of halftone dotted printing having dot densities of 20%, 50% and 80%.

Referring to FIG. 14, it is seen that the image having a halftone dot density of 20% gives binary-coded signals (ba) responsive to the change in density (exchange between the recorded picture element to the unrecorded picture element and vise versa) when the image is binary-coded by the threshold $TH_1$, and that the change in density of the same image gives no binary-coded signal (bb) when it is binary-coded by the threshold $TH_2$. It is also seen that the image having a halftone dot density of 80% gives no binary-coded signals (ba)

responsive to the change in density when it is binary-coded by the threshold $TH_1$, and that the change in density of the same image gives binary-coded signals when it is binary-coded by the threshold $TH_2$. Now referring to the signals for the image having a halftone dot density of 50%, it is seen that the heights of peaks and the depths of troughs of the signal wave are varied at respective locations. Such a variation is found in a case where adjacent black dots or adjacent white dots become contiguous with each other so that a black dot of a certain location is replaced by a white dot or vise versa, or in a case where a certain dot cannot be clearly discriminated as either one of the black or white dot. Extreme difficulties are encountered, in the conventional technology, for the detection of halftone dots from dot matrice of this nature. When the signals for an image having a density of 50% are binary-coded by the threshold $TH_1$, since the first portion Pa has peaks which are higher than the threshold level $TH_1$ and also has troughs which are lower than the threshold level $TH_1$, the peaks are coded as recorded picture elements and the troughs are coded as unrecorded picture elements. However, when the image signals contained in the latter portion Pb are binary-coded by the threshold $TH_1$, the binary-coded signal (ba) contains no unrecorded picture elements since the levels of peaks and troughs are higher than the threshold level $TH_1$. This means that halftone dots (recorded dots) can be detected from the matrix pattern of the recorded and unrecorded picture elements for the first portion Pa by binary-coding by the threshold level $TH_1$, but it is impossible to detect halftone dots for the latter portion Pb.

On the other thand, when the same signal wave is binary coded by the threshold $TH_2$, the binary-coded signal (bb) for the first portion Pa contains no recorded dot since both of the peaks and troughs in the first portion Pa are lower than the threshold level $TH_2$, whereas the binary-coded signal (bb) for the latter portion Pb contains recorded picture elements indicating the peaks and unrecorded picture elements indicating the troughs since the peaks in the latter portion Pb are higher than the threshold $TH_2$ and the troughs in the latter portion Pb are lower than the threshold level $TH_2$. This means that halftone dots (unrecorded dots) can be detected from the matrix pattern of the recorded and unrecorded picture elements for the latter portion Pb by binary-coding by the threshold level $TH_2$, although it is impossible to detect halftone dots for the first portion Pa by binary-coding by the threshold $TH_2$. It will be further understood that reliable detection of dots is expected by setting the level of the threshold to a relatively low level (for example setting the level to the threshold $TH_1$) when it is desired to detect black dots from an image having a low density and giving an image signal wave containing peaks and troughs of low level. On the contrary, when an image has a high density and it is desired to detect white dots, reliable detection of dots is expected by setting the level of the threshold to a relatively high level (for example, setting the level to the threshold $TH_2$) so that the peaks of high level can be discriminated from the troughs of high level.

By setting the threshold $TH_1$ for the detection of white dots to a proper level and also setting the threshold $TH_1$ for the detection of black dots to another proper level, the variance in response to the change in density of the image appears in either one of the signals (ba) or (bb) even when the halftone dot density is 50%. In this embodiment, the varied pattern of the binary-coded signals is compared with a standard pattern to detect dots, and hence it is possible to utilize the variance in binary-coded signals that are responsive to the change in density of an image for the detection of dots. Accordingly, error in detection of halftone dots is avoided even if the density of the image is approximate to 50%. It should be further noted here that the detection pattern (see FIG. 9a) utilized for the detection of black dots is differentiated from the detection pattern (see FIG. 9b) utilized for the detection of white dots, according to this embodiment. This is because each black dot has a shape which is inherently different from the shape of each white dot. In detail, the shape of each black dot is generally circular, whereas the shape of each white dot is not circular since each white dot is formed by a gap or void portion between plural circular black dots. Deformation of the black and white dots is tolerable, and such deformation might be resulted from various causes, such as blotting of the printing ink, influence by an intentional deformation of dots for some reason in printing operation, resolving characteristics of the used image reading system and influence caused by flares.

Even if the image is not the one which has been previously subjected to halftone dotting treatment, there might be a case where some portion of a letter or other image pattern is indistinguishable from a pattern made of black dots and white dots of a halftone dotted image. However, it is desirous that such a pattern is not detected as though it is a halftone dotted pattern. In order to avoid an erroneous detection, each of the detection patterns for the black dots and white dots is selectively designed so that each detection pattern has the optimal size and optimum matrix pattern in the embodiment described above. The output from the gate circuit 232 is a binary-coded signal (q1) indicating whether at least one of the black dot or white dots is detected or not. In order to improve the reliability in discriminating whether the detected dot is a halftone dot or not, the presence or absence of halftone dot is discriminated by subjecting to the following processing.

Figure 7D:
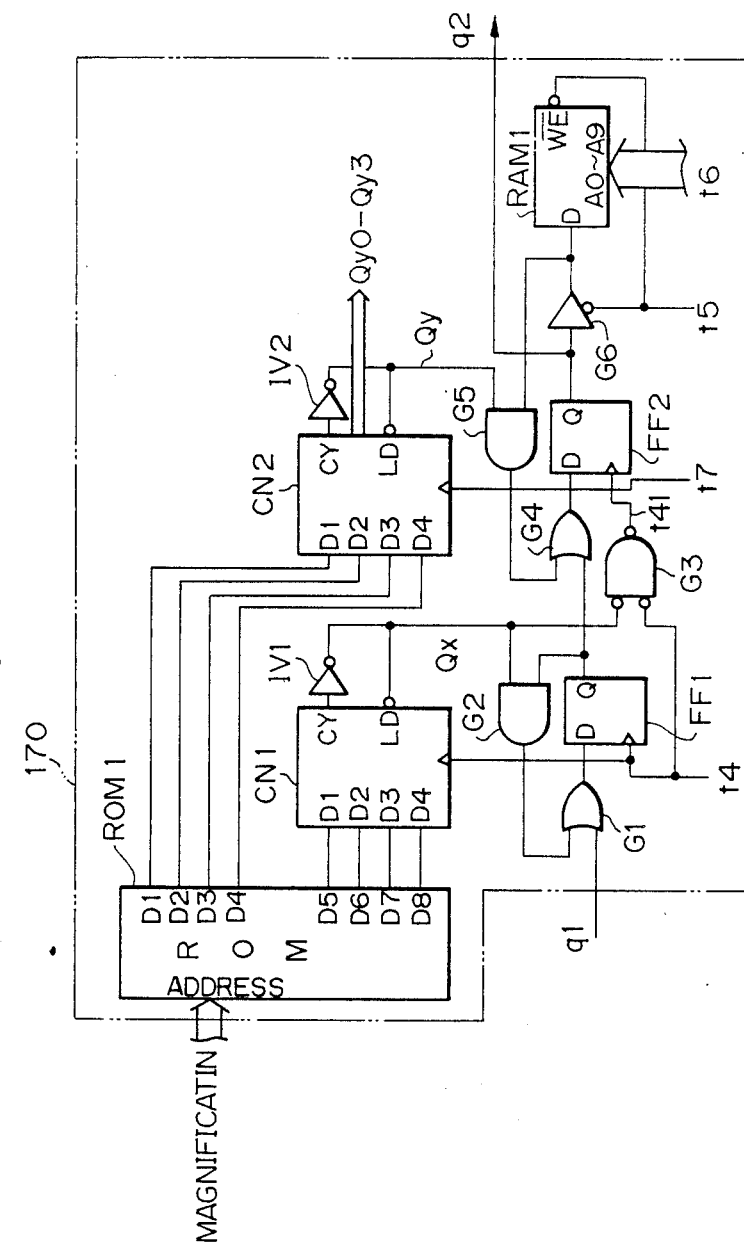

FIG. 7d shows an exemplary construction of the first area detecting circuit 170. In brief, this first area detecting circuit 170 searches a first area to discriminate whether one or more dots are present in the first area or not, the first area being a certain supposed picture element matrix including w picture elements (for example, eight picture elements) along the x direction and w picture elements along the y direction as shown in FIG. 11. The signal q2 takes the value "1" when one or more dots are present in this supposed first area, and takes the value "0" when no dot is present. Referring to FIG. 7d, the circuit 170 comprises a read-only memory ROM1, counters CN1 and CN2, flip-flops FF1 and FF2, a random access memory RAM1, gates G1, G2, G3, G4, G5 and G6 and inverters V1 and V2.

Figure 12A:
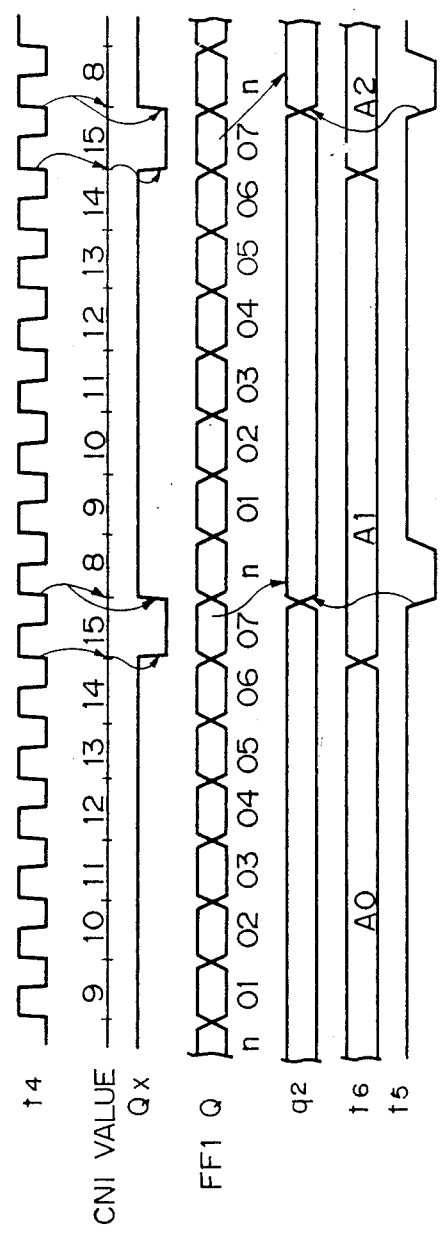
FIGS. 12a and 12b are timing charts showing, respectively, the operation of the first area detection circuit and the operation of the second area detection circuit.

FIG. 12a shows the operational timing of the circuit shown in FIG. 7d. The counter CN1 counts the clock pulses $t_4$ and counts up for every picture elements along the x direction. As the counted number reaches 15, the carry terminal CY becomes a high level H. This signal is inverted and the inverted signal is applied to the preset terminal LDg16, so that the data at the input terminals D1 to D4 are fed to the counter as the next clock pulse is generated. In FIG. 12a, the pre-set data is 8. Accordingly, the counter CN1 functions as a counter of N-mal notation which counts up upon receipt of every clock pulses $t_4$. N may be set as desired within the range of from 1 to 16 by changing the values applied to the data input terminals D1 to D4. In a signal line $Q_x$ generated is a signal which is held at a low level L for one cycle period at every time as the number of clock pulses $t_4$ reaches N. On the other hand, the output signal q2 generated for every picture element in the x direction is passed through the OR gate G1 to the flip-flop FF1 and latched in the FF1 in synchronism with $t_4$. If the signal line $Q_x$ is held at the high level H, the signal latched in the flip-flop FF1 is passed from the output terminal Q through the AND gate G2 to one of the input terminals of the OR gate G1. As the signal q1 has once taken the value "1", the output terminal Q of the flip-flop FF1 is, thus, held to have the value "1" (held at the high level H) until the signal level in the signal line $Q_x$ is lowered to the low level L. As will be seen from FIG. 12a, when the counter CN1 is set to be a counter of octal notation, the signal q1 for the first picture element is initially latched as a signal 01 at the output terminal Q of the flip-flop FF1, and then the logical sum of the signal 01 and the next signal q1 is latched as a signal 02 at the terminal Q of the flip-flop FF1. The aforementioned operation is repeated so that a signal 07 is latched at the terminal Q of the flip-flop FF1 as the logical sum of all of the signals q1 for every eight picture elements serially located along the x direction when the signal level in the signal line $Q_x$ is lowered to the low level. Upon receipt of the next clock pulse $t_4$ while the signal 07 is present, the signal is latched by the flip-flop FF2 and the latched signal is put out as a signal q2. The output signals from the flip-flop FF2 are stored in the random access memory RAM1 in synchronism with the clock pulse $t_5$. The signal $t_6$ for addressing the memory RAM1 is updated for every N picture elements along the x direction to have a value corresponding to the up-to-date location along the x direction. Meantime, the signal $t_6$ has no interrelation with the location of picture elements along the direction y. Accordingly, the memory RAM1 contains the data for one line extending along the x direction. At the timing of generation of a clock pulse $t_{41}$, the data stored in the memory RAM1 for the preceding line (extending in the location "−1" along the y ordinate) are read out, and the read-out data are applied through the AND gate G5 to one input terminal of the OR gate G4.

On the other hand, the counter CN2 functions as a counter of N-mal notation, and counts up upon receipt of every clock pulses $t_7$. The clock pulses $t_7$ are pulses generated in synchronism with the subsidiary scanning, and clock pulses $t_7$ are generated for every time at which the y-axis location of the picture elements is shifted. The operations of this counter CN2 are similar to the counter CN1 in other respects. Accordingly, a signal line $Q_y$ is normally held at the high level H and lowered to the low level L a time for every N picture elements along the y direction. As the data terminal D of the flip-flop FF2 is applied with a signal of high level H even only one time while the signal line $Q_y$ is held at the high level, the flip-flop FF1 and the memory RAM1 hold the logical sum of the high level signal and the input signal, so that the signal q2 takes the high level H. Eventually, an output signal p is generated as the result of operation for obtaining the total logical sum of the output signals (e.g. 07) from the flip-flop FF1 for the area corresponding to N picture elements (N lines) located serially along the y direction, the total logical sum being inspected at the time when the signal in the signal line $Q_y$ is lowered to the low level L. To summarize, each first area is composed of a predetermined picture element matrix of N×N (for example 8×8), and such a matrix is searched. When even one of the signals q1 for every picture elements takes the value "1", the signal q2 takes the value "1", and the signal q2 takes the value "0" in the other case. This signal q2 indicates the result of detection by the first area detecting circuit as to the presence or absence of dots, namely the presence or absence of halftone dots.

On the other hand, the data terminals D1 to D4 of the counter CN1 are connected to the data terminals D5 to D8 of the read-only memory ROM1, and the data terminals D1 to D4 of the counter CN2 are connected to the data terminals D1 to D4 of the read-only memory ROM1. The signal indicating the magnification in copying is applied to the adress terminal of the memory ROM1. The read-only memory ROM1 stores the informations relating to the dimensions of the first area corresponding to respective magnifications in copying operation. For instance, as the first area includes 8×8 picture elements when the magnification in copying oporation is 1.0 in this embodiment, the outputs from the first group 4-bit output terminals D1 to D4 of the ROM1 are "8" and the outputs from the second group 4-bit output terminals D5 to D8 are also "8". In this case, "8" is preset in each of the counters CN1 and CN2, and each counter operates as an counter of octal notation and counts 8, 9, 10, 11, 12, 13, 14, 15, 8, 9, 10, ---. When the magnification in copying operation is changed, the range of numbers counted by the counters CN1 and CN2 is changed, whereby the dimensions of the first area or the number of picture elements contained therein is changed.

Figure 7E:
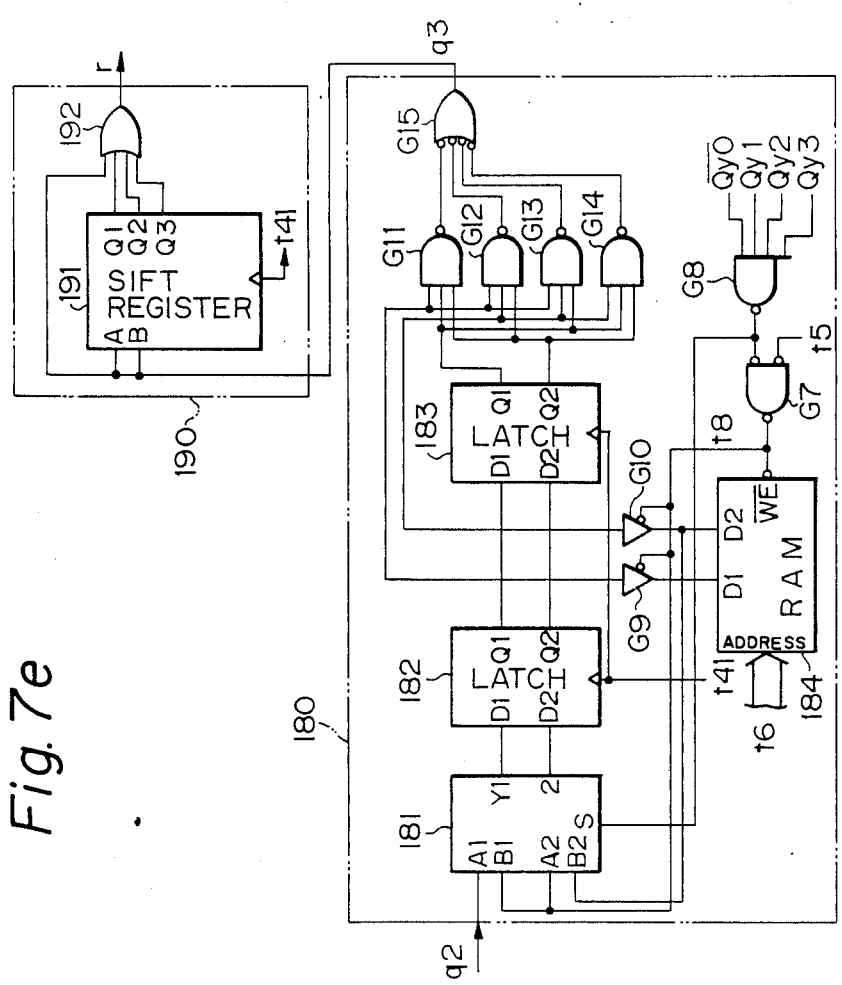

FIG. 7e shows the constructions of the second area detecting circuit 180 and the third area detecting circuit 190. Referring to FIG. 7e, the second area detecting circuit will be initially described. In brief, the second area detecting circuit 180 searches through a second area including four first areas located adjacently with each other both along the x direction and the y direction, as shown in FIG. 11, and discriminates whether or not the second area has three or more first areas in which dots are detected (i.e. the signals q2 take the value "1"). If dots are detected in three or more first areas, the signal q3 for a predetermined first area included in the second area is set to "1" to indicate that the halftone dot is detected. This second area detection processing is carried out for preventing erroneous detections as described below. If a dot is missing due to misprinting or other failures on the document sheet or failure in detection of dot occurs due to misreading or other malfuntions of the copying apparatus, a signal q2 indicating the absence of halftone dotting is generated as the result of discrimination of the area which has been previously subjected to halftone dotting treatment. On the contrary, there might arise a case where a portion of a letter or a stain on the background is erroneously detected as one dot so that a signal q2 might be generated to indicate as if the searched area is the one which has been previously subjected to halftone dotting treatment.

Figure 12B:
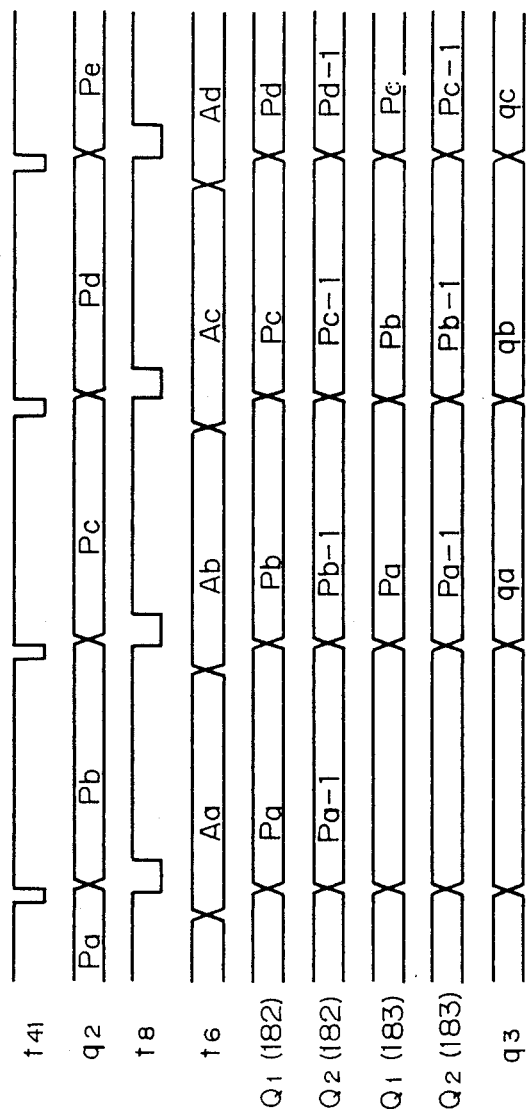

The operation timing of the second area discriminating circuit 180 is shown in FIG. 12b. Referring to FIGS. 7e and 12b in combination, the second area detecting circuit 180 includes a data selector 181, latches 182 and 183, and a random access memory 184. The data selector 181, the latch 182 and the random access memory 184 are the circuits for delaying the signals q2 fed for every first areas by the number of picture elements contained in the first area along the y direction, so that the output terminals Q1 and Q2 of the latch 182 feed the signals for two first areas at the same timing, the two first areas being adjacent with each other along the y direction. The latch 183 is a circuit for delaying the signals fed from the latch 182 by the number of picture elements contained in the first area along the x direction, so that the output terminals Q1 and Q2 of the latch 183 feed the signals obtained by delaying the signals fed from the output terminals Q1 and Q2 of the latch 182, respecitively, by the picture elements contained in one first area along the x direction. As the result, signals q2 for respective four first areas contained in the second area are fed at the same timing from the output terminals Q1 and Q2 of the latch 182 and the output terminals Q1 and Q2 of the latch 183. The signals q2 for the first areas E1, E2. E3 and E4 shown in FIG. 11 are fed, respectively, from 183-Q1, 182-Q1, 183-Q2 and 182-Q2. These four signals are processed through gates G11, G12, G13, G14 and G15 to generate a signal q2. When three or more of the four signals (q2) take the value "1", the signal q3 takes the value "1". For example, when three or more of the signals q2 for the areas E1, E2, E3 and E4 take the value "1", the output signal q3 for the first area E4 takes the value "1".

In FIG. 12b, Pa, Pb, Pc, Pd, ---- are signals (q2) for respective first areas; qa, qb, ---- are signals (q3) for respective first areas; and pa-1, pb-1, pb-c, ---- are signals which are obtained by delaying the signals pa, pb, pc, ---- by the number of picture elements in the first area along the y direction. The signal qb is determined, for example, by the four signals pb-1, pb, pc-1 and pc.

The third area detecting circuit 190 will now be described. In brief, the third area detecting circuit 190 searches through a third area including four first areas serially located along the x direction, as shown in FIG. 11, and discriminates that the searched third area is the area which has been previously subjected to halftone dotting treatment when at least one of the four first areas included therein contains halftone dotting to set the signal r to the value "1". This third area detecting operation is carried out to avoid the problem of moiré. Due to the scanning method and construction, moiré appears more frequently along the main scanning direction than along the subsidiary scanning direction. Little or no more occurs by the scanning along the subsidiary direction. When the resolving power in reading the image is set to 16 pictures/mm, moiré having a halftone pitch of about 1 to 3 mm results although the occurrence of moiré is affected by the pitch of the halftone dot and also by the angle of the halftone dotting pattern relative to the scanning direction. As the amplitude of the read-out signal is decreased by the moiré, the accuracy of the dot detecting operation is lowered and error in dot detection operation might result in some cases. This third area detecting process is not necessary when there is no possibility of appearance of moiré.

Since 32 picture elements are arranged along the x direction of the third area and the resolving power in image read-out operation is 16 picture elements/mm in the illustrated embodiment, the pitch of the third area is 2 mm. Referring to FIG. 7d, the third area detecting circuit 190 comprises a shift register 191 and an OR gate 192. The shifts register 191 shift the signal q3 for every picture element along the x direction in synchronism with the clock pulses $t_{41}$. If the signal q takes the value "1" for at least one first area of the four first areas arranged serially along the x direction, the signal r is set to the value "1" for all first areas contained in the same third area. Referring to FIG. 11, if the signal q for the first area E1 in one third area takes the value "1", the signals q for the other areas E2, E5 and E6 contained in the same third area take the value "1".

Figure 13:
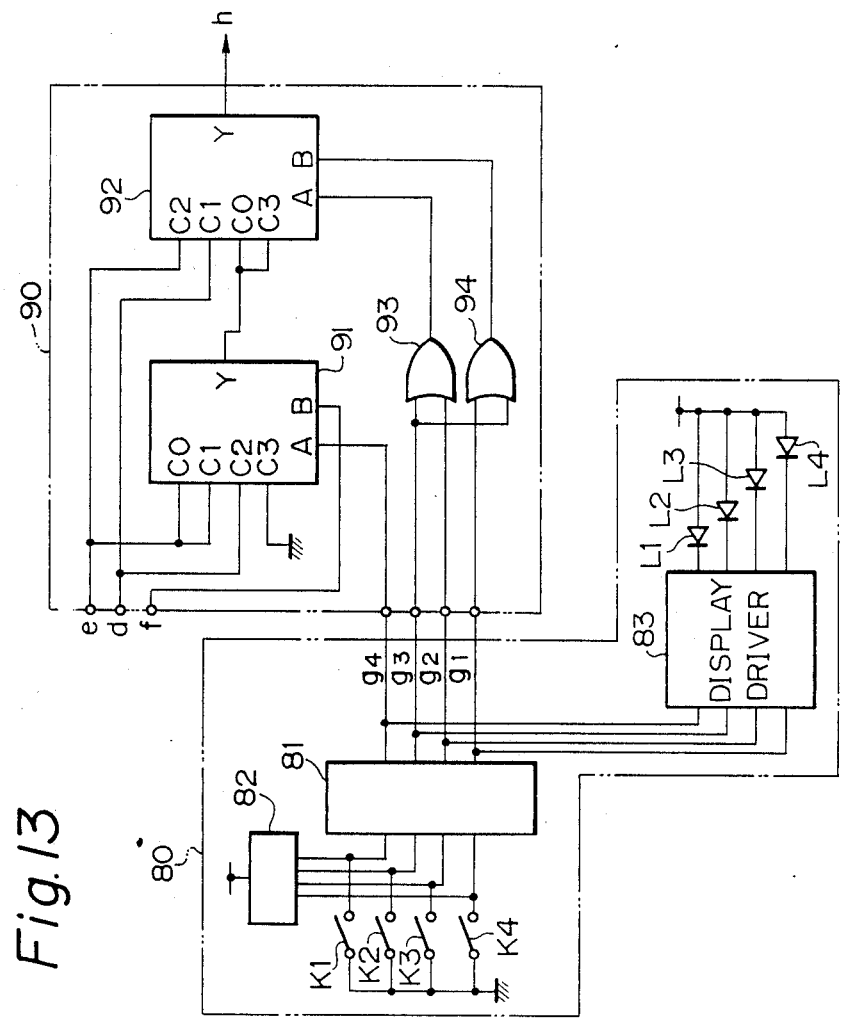
FIG. 13 is an electric circuit diagram showing the operation control section and the output control section.

FIG. 13 shows the constructions of the operation control section 80 and the output control section 90 shown in FIG. 13. Although four operation modes for generating signals are provided in the illustrated embodiment, only the operation mode which is commonly used will be described below. When the mode key K3 is switched on, an automatic separation mode is selected. In this mode, when the signal (f) takes the value "1", i.e. when the input image is a halftone image or halftone dotted image, a signal which is same as the signal (d) for the image subjected to halftone processing through the sub-matrix method is generated. On the contrary, when the signal (f) takes the value "0", i.e. the input image is a binary image rather than a halftone image, the output signal fed to the printer 2 is a signal same as the signal (e) which is simply binary-coded by the threshold $TH_3$. Thus, the image which has been previously subjected to halftone dotting treatment is processed by the halftone processing operation so that occurrence of moiré is avoided.

Figure 15A:
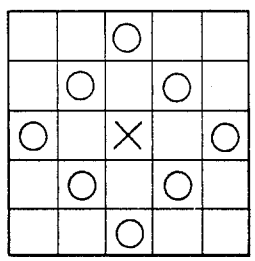
FIGS. 15a, 15b, 15c and 15d are plan views showing modified examples of dot detection pattern.
Figure 15B:
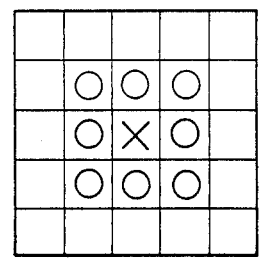
Figure 15C:
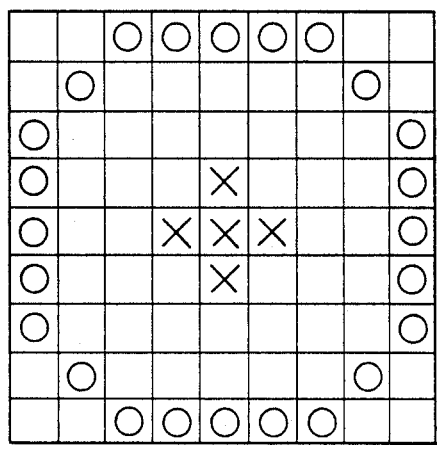
Figure 15D:
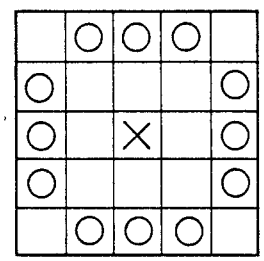

Various modifications will become possible for those skilled in the art after receiving the teachings of the present disclosure without departing from the scope thereof. For example, patterns for detecting the black dots and the white dots may be modified. Examples of the white dot detection pattern which may be used in the present invention are shown in FIGS. 15a and 15b. The pattern shown in FIG. 15c may be used as a black dot detection pattern and the pattern shown in FIG. 15d is used as a white dot detection pattern. The patterns shown in FIGS. 15c and 15d are effectively used for the detection of halftone dots of a halftone dotted printing having a coarse pitch, such as the printing for news paper.

As will be appreciated from the foregoing, erroroneous detection of halftone dots is avoided in accordance with the present invention. Particularly, it has been found that the present invention contributes a considerable improvement in elimination of partial erroneous detection otherwise resulted in case where a halftone dotted image having a density of 30% to 60% is detected by the conventional technology.

What is claimed is:

1. An image area discriminating device for discriminating whether individual scanned areas of an input image have been previously subjected to halftone dotting treatment or not, comprising:

first binary-coding means for binary-coding said input image along the main scanning direction and for producing a comparison of said image with a first threshold along a two-dimensional path and which comprises a two-dimensional information generator means for delaying the input image as a function of a time series sequence, along the main scanning direction and also along the subsidiary scanning direction for every picture element and for outputting digital signals relating plural picture elements and arranged to form a matrix along the main and subsidiary scanning directions concurrently;

recorded dot detector means for accepting a first binary-coded data outputted by said first binary-coding means and comparing a two-dimensional matrix pattern of said first binary-coded data with a preset recorded dot detection pattern and for outputting the result of comparison;

second binary-coding means for binary-coding said input image along the main scanning direction and for comparing said binary-coded image with a second threshold which is different from said first threshold and which comprises a two-dimensional information generator means for delaying the input image as a function of a time series sequence, along the main scanning direction and also along the subsidiary scanning direction for every picture element and for outputting digital signals relating plural picture elements and arranged to form a matrix along the main and subsidiary scanning directions concurrently;

unrecorded dot detector means for accepting the second binary-coded data outputted by said second binary-coding means and comparing the two-dimensional matrix pattern of said second binary-coded data with a preset unrecorded dot detection pattern and for outputting the result of said comparison; and halftone dot pattern discriminator means for receiving the output from said recorded dot detector means and the output from said unrecorded dot detector means to discriminate whether the input image is a halftone dotted pattern.

2. An image area discriminating device as claimed in claim 1, in which said recorded halftone dot pattern discriminator means discriminates the number or presence/absence of outputted data from said recorded dot detector means and said unrecorded dot detector means at predetermined intervals for two-dimensional areas of said input image.

3. An image area discriminating device as claimed in claim 1, in which said recorded halftone dot pattern discriminator means discriminates the number or presence/absence of outputted data from said recorded dot detector means and said unrecorded dot detector means at predetermined intervals for two-dimensional areas of said input image.

4. An image area discriminating device for discriminating whether scanned areas of an input image have been previously subjected to halftone dotting treatment or not, comprising:

first binary-coding means for binary-coding said input image along the main scanning direction and for producing a comparison of said image with a first threshold along a two-dimensional path and which comprises a two-dimensional information generator means for delaying the input image as a function of a time series sequence, along the main scanning direction and also along the subsidiary scanning direction for every picture element and for outputting digital signals relating plural picture elements and arranged to form a matrix along the main and subsidiary scanning directions concurrently;

recorded dot detector means for accepting a first binary-coded data outputted from said first binary-coding means and comparing a two-dimensional matrix pattern of said first binary-coded data with a preset recorded dot detection pattern and for outputting the result of said comparison;

second binary-coding means for binary-coding said input image along the main scanning direction and for comparing said binary-coded image with a second threshold which is different from said first threshold and which comprises a two-dimensional information generator means for delaying the input image as a function of a time series sequence, along the main scanning direction and also along the subsidiary scanning direction for every picture element and for outputting digital signals relating plural picture elements and arranged to form a matrix along the main and subsidiary scanning directions concurrently;

unrecorded dot detector means for accepting the second binary-coded data outputted by said second binary-coding means and comparing the two-dimensional matrix pattern of said second binary-coded data with a preset unrecorded dot detection pattern and for outputting the result of said comparison, said unrecorded dot detector means including an unrecorded dot detection pattern which is different from said recorded dot detection pattern in at least one of the dimensions of the patterns, the arrangement of the patterns or the number of detection conditions; and halftone dot pattern discriminator means for receiving the output from said recorded dot detector means and the output from said unrecorded dot detector means to discriminate whether the input image information is a halftone dotted pattern.

5. An image area discriminating device as claimed in claim 4, in which said recorded halftone dot pattern discriminator means discriminates the number or presence/absence of data outputted by said recorded dot detector means or said unrecorded dot detector means at predetermined intervals for the two-dimensional areas of said input image.

6. An image area discriminating device as claimed in claim 4, in which said second threshold is set at a higher image density level as compared to the image density level corresponding to said first threshold.

7. An image area discriminating device as claimed in claim 4, in which said second threshold is set at a higher image density level as compared to the image density level corresponding to said first threshold.

8. An image area discriminating device as claimed in claim 5, in which said second threshold is set at a higher image density level as compared to the image density level corresponding to said first threshold.

* * * * *